(12) United States Patent
Hull

(10) Patent No.: US 10,926,309 B2
(45) Date of Patent: Feb. 23, 2021

(54) SELF-REGENERATING REMEDIATION TREATMENTS AND METHODS

(71) Applicant: AquaBlok, Ltd., Swanton, OH (US)

(72) Inventor: John H. Hull, Ottawa Hills, OH (US)

(73) Assignee: AquaBlok, Ltd., Swanton, OH (US)

( * ) Notice: Subject to any disclaimer, the term of this patent is extended or adjusted under 35 U.S.C. 154(b) by 0 days.

(21) Appl. No.: 15/326,560

(22) PCT Filed: Jun. 24, 2015

(86) PCT No.: PCT/US2015/037386
§ 371 (c)(1),
(2) Date: Jan. 16, 2017

(87) PCT Pub. No.: WO2016/014199
PCT Pub. Date: Jan. 28, 2016

(65) Prior Publication Data
US 2017/0203346 A1 Jul. 20, 2017

Related U.S. Application Data

(60) Provisional application No. 62/027,356, filed on Jul. 22, 2014.

(51) Int. Cl.
B09C 1/10 (2006.01)
B09C 1/08 (2006.01)

(52) U.S. Cl.
CPC ............... B09C 1/10 (2013.01); B09C 1/08 (2013.01); B09C 2101/00 (2013.01)

(58) Field of Classification Search
CPC .. B09C 1/002; B09C 1/08; B09C 1/10; B23B 5/16; E02B 3/12
See application file for complete search history.

(56) References Cited

U.S. PATENT DOCUMENTS 5,538,787 A * 7/1996 Nachtman ............... E02B 3/12
405/17
5,897,946 A 4/1999 Nachtman et al.
(Continued)

FOREIGN PATENT DOCUMENTS

WO 95/01230 A1 1/1995
WO 2005042406 A2 5/2005
(Continued)

OTHER PUBLICATIONS http://www.nationalslag.org/benefits-slag-products. (Year: 2013).*
(Continued)

Primary Examiner — Tara Mayo-Pinnock
(74) Attorney, Agent, or Firm — MacMillan, Sobanski & Todd, LLC

(57) ABSTRACT

Contaminated sediment is re-mediated using a self-regenerating reactive sedimentation capping system comprising a system of composite particles having a core and a coating. The coating of at least some particles further include a complexing or sorptive reactive material, such as activated carbon, appatite, a clay or organoclay, or a synthetic sorptive such as Sorbster™. The same or different particles contain a composition of dormant microbes capable of utilizing various contaminants as a food source. The same or other particles may also contain nutrients, micronutrients, vitamins, cofactors, buffers or other adjunctive compounds to sustain the microbes. The microbes feed on and degrade the contaminant compounds complexed, absorbed or adsorbed by the reactive material, thereby regenerating the reactive material for re-use.

22 Claims, 1 Drawing Sheet

(56) References Cited

U.S. PATENT DOCUMENTS

| | | |
|---|---|---|
| 6,386,796 B1 | 5/2002 | Hull |
| 6,423,533 B1 | 7/2002 | Gearheart et al. |
| 6,503,740 B1 | 1/2003 | Alther |
| 6,558,081 B2 | 5/2003 | Hull |
| 7,011,766 B1 | 3/2006 | Hull |
| 7,129,388 B2 | 10/2006 | Scalzi et al. |
| 7,438,500 B2 | 10/2008 | Hull |
| 7,531,709 B2 | 5/2009 | Scalzi et al. |
| 7,828,974 B2 | 11/2010 | Scalzi |
| 8,147,694 B2 | 4/2012 | Scalzi et al. |
| 8,673,606 B2 | 3/2014 | Menashe |
| 2002/0150429 A1 | 10/2002 | Hull |
| 2005/0005869 A1* | 1/2005 | Fritter .................. A01K 1/0152 119/173 |
| 2007/0113756 A1* | 5/2007 | Hull .................... C04B 20/1055 106/811 |
| 2007/0297858 A1 | 12/2007 | Imbrie |
| 2010/0232883 A1* | 9/2010 | Hoag ...................... B09C 1/002 405/128.75 |
| 2011/0044761 A1* | 2/2011 | Chang .................. C05G 3/0041 405/128.75 |
| 2014/0030797 A1 | 1/2014 | Scalzi |
| 2015/0266069 A1* | 9/2015 | Trauger ................... B09C 1/08 405/128.5 |

FOREIGN PATENT DOCUMENTS

| | | |
|---|---|---|
| WO | 2012/048215 A2 | 4/2012 |
| WO | 2013192153 A1 | 12/2013 |

OTHER PUBLICATIONS http://www.nationalslag.org/common-uses-slag. (Year: 2013).*
Payne et al., "Enhanced Reductive Dechlorination of Polychlorinated Biphenyl Impacted Sediment by Bioaugmentation with a Dehalorespiring Bacterium", Environmental Science & Technology, 2011, vol. 45, pp. 8772-8779.
PCT International Search Report and Written Opinion, Application PCT/US2015/037386, dated Sep. 11, 2015.
Sowers et al., "In situ treatment of PCBs by anaerobic microbial dechlorination in aquatic sediment: are we there yet?", Current Opinion in Biotechnology, 2012, vol. 24, pp. 1-7.
Extended European Search Report, Application No. 15825496.1, dated Apr. 11, 2018.
European Communication pursuant to Article 94(3) EPC, Application No. 15825496.1, dated Mar. 16, 2020.

* cited by examiner

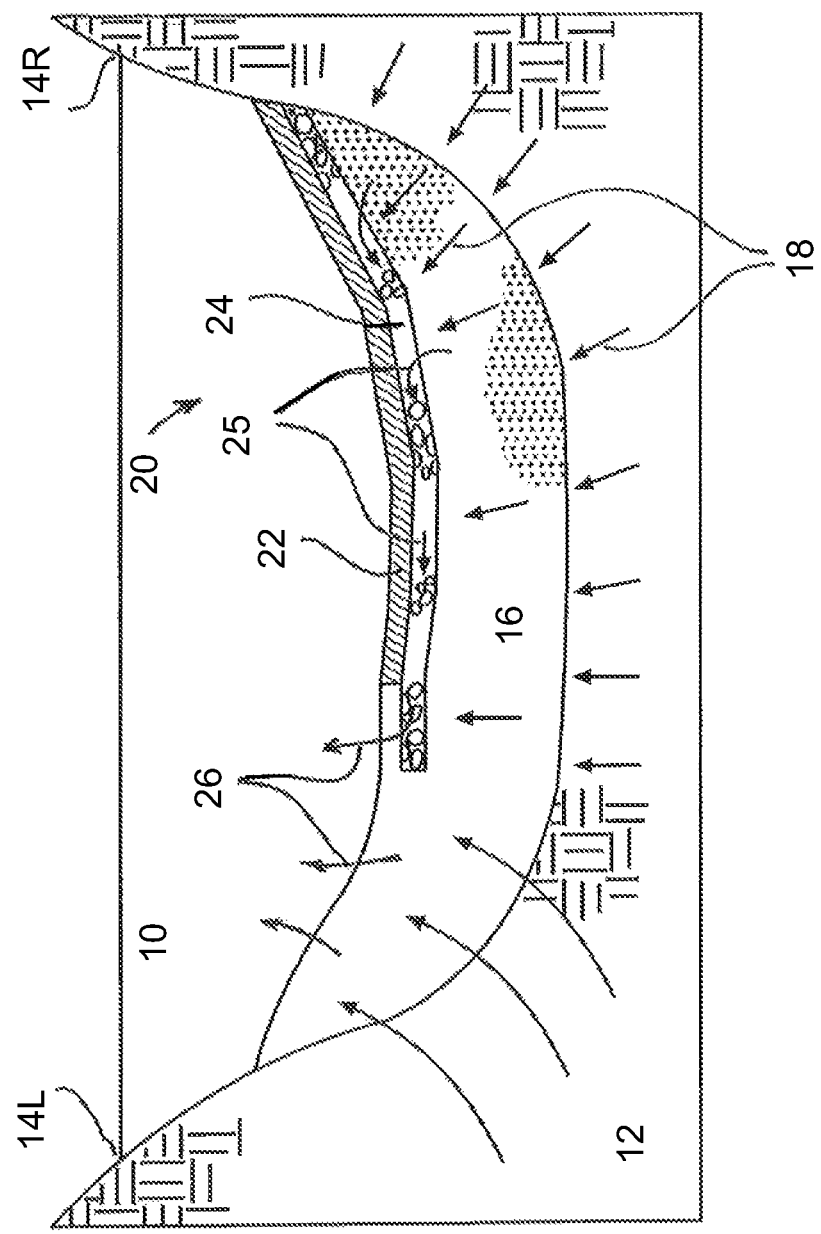

SELF-REGENERATING REMEDIATION TREATMENTS AND METHODS

BACKGROUND OF THE INVENTION

This invention generally relates to materials and methods for environmental remediation, including in particular, materials and methods for prolonging the lifespan of remedial reactive materials used in sediment capping systems.

Sediment capping remediation systems mitigate the migration of contaminants through sediments where they may negatively impact the quality of water and aquatic life which, in turn, may have significant adverse affects on human health. Through a variety of uptake mechanisms, contaminants may enter the base of the food chain, which has many implied ecological receptor and human health risks. Typical contaminants include both (1) organic pollutants (e.g., pesticides, insecticides, herbicides, polynuclear aromatic hydrocarbons (PAHs), chlorinated hydrocarbon compounds such as polychlorinated biphenyl (e.g., PCBs), tributyl-tin (TBT), dioxin, volatile organic compounds (VOCs), organic solvents, and/or non-aqueous phase liquids (NAPL); and (2) inorganic pollutants (e.g., heavy metals such as mercury and arsenic, ammonia, nitrates, and/or phosphates). The relative mobility and bioavailability of these contaminants can present ecological or human health hazards.

The specific sediment capping strategy that is ultimately deployed depends on many factors. Two generalized approaches are possible: (1) passive capping, which is the deployment of a barrier material that may be relatively impermeable to both the water above and the contaminants below, so as to sequester contaminants or at least diffuse them to reduce contaminant concentrations in pore water; and (2) active/reactive capping, which employs one or more additives or "amendments" to the barrier in an effort to bind up and/or destroy the contaminants. The choice of which approach depends on a wide variety of site-specific issues, demands and conditions.

Currently, at least two main active/reactive sediment capping systems are commercially available for sediment capping remediation: (1) the REACTIVE CORE MAT® sediment capping system commercially sold by CETCO and others; and (2) the AquaBlok®/AquaGate™ or Blended Barrier™/AquaGate™ (AB/AG or BB/AG) sediment capping systems commercially sold by AquaBlok, Ltd.

The REACTIVE CORE MAT® (RCM) is a generic treatment reagent delivery platform in the form of a permeable composite mat that is primarily composed of at least one reactive filler material sandwiched between two nonwoven fabric geotextile materials and typically furnished in standard roll widths of 15 feet. Non-limiting examples of the reactive filler material include granular porous treatment reagents, activated carbon, apatite, organoclay, montmorillonite, and combinations thereof. An organoclay (OC) treatment reagent is frequently used as the reactive filler material and is reported to be effective at NAPL immobilization and reducing organic sheens while allowing the passage of water. Non-limiting examples of the geotextile materials include polypropylene (PP), high density polyethylene (HDPE), and combinations or copolymers thereof. An advantage of the RCM is that its porous nature allows for the dissipation of positive pore water pressures associated with upwelling groundwater over its entire surface, unless its ability to transmit water is reduced due to swelling/ingress of NAPL or due to clogging by fines or biofilms. An additional advantage of the RCM is that its thin, lightweight profile minimizes overburden pressures on soft underlying sediments while maximizing the available water column thickness in shallow waters, such as canals. Multiple RCM layers, of the same or different composition, can be positioned at or near the sediment surface to accommodate a variety of contaminant loading scenarios. The RCM may be used in combination with a protecting or "armoring" layer, such as a TRITON® marine mattress.

A TRITON® marine mattress (MM) system is traditionally composed of a planar rock-filled reinforced geogrid material. The TRITON® MM system can be lined with a geotextile fabric material and also filled with at least one reactive filler material. Non-limiting examples of the reinforced geogrid material and/or the geotextile fabric material include materials polypropylene (PP), high density polyethylene (HDPE), and combinations or copolymers thereof. Traditional designs of the Triton® MM system use natural quarried aggregates or natural river-rock of up to several inches in diameter, and it is understood that various industrial by-products, recycled and/or composite particles of similar size could be likewise incorporated. Non-limiting examples of the reactive filler material include granular materials (such as crushed apatite, limestone, slags, and crushed concrete, etc) and/or composite porous treatment reagents, activated carbon, apatite, organoclay, organoclay montmorillonite, and combinations thereof, either in bulk or as amendments to AquaBlok® or Blended Barrier™ materials. The TRITON® MM system can be used as a ballast layer and/or an armoring layer for armoring passive or active sediment caps and structures associated therewith. For example, a traditional rock-filled TRITON® MM system may be placed above a RCM, and optionally affixed thereto with fasteners, to serve as an armoring layer for protecting the RCM against damage and erosion.

The second type of active/reactive capping system—AquaBlok®/AquaGate™ or Blended Barrier™/AquaGate™ (AB/AG or BB/AG) are commercially sold by AquaBlok, Ltd. Briefly, these systems employ an aggregate core particle that is layered with the reactive amendment materials and deployed over the contaminated site. These particles are described in greater detail below.

One problem with active/reactive capping systems is their tendency to lose effectiveness over time, due essentially to saturation. Some treatment products reduce the bioavailability of toxic material by chemical fixation/complexation, some by sorption, both absorption and adsorption (e.g. activated carbon/organoclays or silt and clay soil particles, respectively), and some by a combination of sorption and chemical fixation (Sorbster™). The sorptive capacity is limited, however, based on the amount of reactive material applied and the finite number of sites available for sorbing and complexing. Once saturated, the reactive material no longer protects the environment from continued contaminant flux.

In a process known as "bioremediation," certain toxins can be reduced by encouraging the microbial destruction or reduction of persistent, long-chain toxic organics by biodegradation wherein a microbe is introduced into the contaminated media to degrade the toxic organic compound. The "oil-eating" microbes used by the oil industry to clean up oils spills are examples. The microbes may be either naturally occurring or genetically engineered to be able to utilize the contaminant compounds as food sources. These microbes may be deployed either alone or in combination with other chemicals (such as hydrogen or oxygen) and/or micronutrients that can enhance targeted microbial activity.

Others (Alther-Biomin, U.S. Pat. No. 6,503,740 B1, issued Jan. 7, 2003) have demonstrated the ability to deliver microbes in combination with a sorbent treatment material (organoclay) wherein the organoclay product is inoculated with dormant microbes capable of breaking down complex chlorinated toxins such as dioxin and PCBs. However, the inability to deliver these materials to a sediment capping system through a column of water has limited the success of this approach.

FIG. 1 illustrates a body of water 10 supported by ground 12, the ground forming shorelines 14L, 14R at the margins of the body of water 10. A base layer of sediment 16 may collect between the body of water 10 and the ground 12. In situations of contamination, contaminated pore fluids may enter the sediment (shown by plume arrows 18 on the right hand side near the shoreline) and, under upwelling hydrostatic forces, the plume of contamination migrates upward toward the sediment surface. The FIGURE further depicts a "funnel and gate" active sediment capping system 20, having a permeable layer 24 such as AquaGate™, mostly covered by an impermeable layer 22, such as AB, thus comprising an AB/AG capping system. An alternative capping system (not shown) is a Blended Barrier™/AquaGate™ (BB/AG) active/reactive sediment capping system. At some distance from the shoreline 14L (left-hand side), the sediment is no longer impacted by contaminated groundwater and a capping system 20 is no longer required.

The AB/AG and BB/AG systems typically contain at least two different sets of a plurality of composite particles having different properties, each composite particle comprising a core and a sealant layer at least partially encapsulating the core. For example, the AB (passive capping) layer 22 may comprise a set of a plurality of composite particles that form an impermeable barrier, while the AG layer 24 (whether with active treatment or simply drainage blanket) may comprise a different set of a plurality of composite particles that form a permeable and/or filtering layer. See, e.g. U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, and U.S. Pat. No. 7,438,500, which issued to Hull on Oct. 21, 2008, each of which is incorporated herein by reference in their entirety. These active (reactive) sediment capping systems are discussed in more detail herein.

SUMMARY OF THE INVENTION

Multiple successful environmental treatment products have been developed to capture environmental contaminants such as spilled hydrocarbons (such as petroleum, coal tar, PCBs) and dissolved phase metals (such as mercury) that are subject to methylation. The relative mobility and bioavailability of the contaminant can present ecological or human health hazards. Some treatment products reduce the bioavailability of toxic material by chemical fixation, some by sorption, both absorption and adsorption (e.g. activated carbon/organoclays or silt and clay soil particles, respectively), and some by a combination of sorption and chemical fixation (Sorbster™). The sorptive capacity is limited, based on the amount of active material applied and once saturated can no longer protect the environment from continued contaminant flux. Other means of reducing biotoxicity can be accomplished by encouraging the microbial destruction or reduction of persistent, long-chain toxic organics by biodegradation wherein a microbe either occurs naturally or a specially developed microbe is introduced into the contaminated media either alone or such as in combination with other chemicals (such as hydrogen or oxygen) or micronutrients that can enhance targeted microbial activity to more efficiently degrade the toxic organic compound.

Others (Alther- Biomin, see, e.g. U.S. Pat. No. 6,503,740) have demonstrated the ability to deliver microbes in combination with a sorbent treatment material (organoclay) wherein the organoclay product is inoculated with dormant microbes designed to breakdown complex contaminants such as dioxins.

The AquaBlok delivery technology has been used to successfully incorporate dormant microbes for successful delivery to contaminated sediments, and has been formulated with treatment amendments such as powdered activated carbon, organoclay and Sorbster to deliver such treatment amendments through a water column.

What would be advantageous is to combine the delivery of sorbent amendments (and micronutrients) coupled with appropriately selected dormant microbes so that while the sorbents begin to concentrate the contaminant, the microbes become active and consume the contaminant resulting in the generation of less toxic by-products that can be released into the environment through diffusion or ebullition.

The coupling of the materials can be accomplished by blending the microbes and sorptive material together in a manufactured particle or by manufacturing two (or more) separate particles—one containing sorbents and separate particles containing microbes and micronutrients or pH buffers, etc. necessary to achieve enhanced microbial activity. By balancing relative particle size and density using Stokes Law, the placement of a targeted layer of appropriately blended materials through a water column to provide a combination interim sorption active cap layer with long-term regenerative capacity through in-situ biodegradation to render captured contaminants less toxic and to restore the sorptive capacity of the treatment amendment, thus prolonging the life of the treatment system, reducing risk from long-term disturbance of the active in-situ system and potentially reducing the need for constructing a thicker treatment application, thus reducing the need for mitigation of floodway encroachment by preparatory dredging or other measures.

BRIEF DESCRIPTION OF THE DRAWINGS

FIG. 1 is a cross-sectional view of an AquaBlok®/AquaGate™ sediment capping system.

DETAILED DESCRIPTION OF THE INVENTION

As used in this disclosure, certain acronyms and terms have the meanings ascribed below. The term "AB" means AquaBlok®, one example of an impermeable layer of a sediment capping system. The term "AG" means AquaGate™, one example of a permeable layer of a sediment capping system. The term "BB" means Blended Barrier™, which is a blend of an AquaBlok® impermeable barrier and aggregate rock.

The term "RCM" refers to a REACTIVE CORE MAT®, or a structural, hydraulic, and functional equivalent thereof. The term "MM" refers to a TRITON® marine mattress system, or a structural, hydraulic, and functional equivalent thereof.

The term "GG" means a geogrid and the term "NWGT" means a non-woven geotextile, as each of these is further described herein.

The term "GM" means a geomembrane. The term "GCL" means a geosynthetic clay liner. The term "GM-GCL" is understood in the context of this disclosure to mean a geomembrane-supported geosynthetic clay liner.

The term "daylighting" refers to the escape of upwelling groundwater and/or gasses (collectively "pore fluids") to the overlying column or body of water. It will be understood that groundwater may carry with it dissolved contaminants and/or gasses, and is thus a "fluid," and this fluid is filtered through porous media—whether naturally occurring or synthetic—and is thus characterized as a "pore fluid." This is typically in the context of a sediment capping system that includes an impermeable barrier that directs the upwelling pore fluids to a non-contaminated area. Daylighting is depicted in FIG. 1 with arrows 26.

The terms "permeable" and "impermeable" are understood in the context of this disclosure to be with respect to conductivity of fluids; i.e. they refer, respectively, to the properties of materials that permit/block the flow of water, gasses and NAPLs therethrough. Permeability or "hydraulic conductivity" (K) is measured in rates of flow (e.g. cm/sec) as described below.

Where a closed or open-ended numerical range is described herein, all values and subranges within or encompassed by the numerical range are to be considered as being specifically included in and belonging to the original disclosure of the present application as if these values and subranges had been explicitly written out in their entirety. The upper and lower limits of all numerical ranges are deemed to be preceded by the modifier "about."

All patent applications, patent application publications, patents, scientific and technological literature, publications and references specifically mentioned herein are incorporated herein by reference in their entirety.

Composite Particles

The composite particles used in AB, AB/AG, or BB/AG sediment capping systems are known and described in the art along with various specific embodiments and/or sediment capping systems containing the same. See for reference U.S. Pat. No. 5,538,787, which issued to Nachtman et al. on Jul. 23, 1996, U.S. Pat. No. 5,897,946, which issued to Nachtman et al. on Apr. 27, 1999, U.S. Pat. No. 6,386,796, which issued to Hull on May 14, 2002, U.S. Pat. No. 6,558,081, which issued to Hull on May 6, 2003, U.S. Pat. No. 7,011,766, which issued to Hull on Mar. 14, 2006, U.S. Pat. No. 7,438,500, which issued to Hull on Oct. 21, 2008, and WO 2012/048215 published Apr. 12, 2012, each of which is incorporated herein by reference in their entirety. The particles may have any desired particle diameter, non-limiting examples of which include composite particles having a particle diameter of less than ¾ inches (~20 mm), including ¼-¾ inches (~5 mm to ~20 mm), and ¼-⅜ inches (~5 mm to ~10 mm).

The core of the composite particles may include a granular piece of stone, rock, gravel, sand, or slag, non-limiting examples of which include a granular piece of crushed limestone or other chemically/physically stable earthen aggregate. The core may have any desired particle diameter, a non-limiting example of which includes a particle diameter of ¼-⅜ inches (~5 mm to ~10 mm) The core may be more dense, less dense or equally as dense as the sealant layer. In an exemplary embodiment, the core has a relatively greater density as compared to that of the sealant layer.

The sealant layer of the composite particles may partially or completely encapsulate the core. The sealant layer may include at least one reactive material, non-limiting examples of which include a clay, a water absorbent clay that is readily hydratable and has a high swelling capacity (e.g., a bentonite clay, such as high quality Wyoming-derived sodium bentonite clay containing montmorillonite), an organoclay, a clay mineral (e.g., montmorillonite, illite, kaolinite, and attapulgite), a non-swelling reactive material (e.g., activated carbon), and combinations thereof. The reactive material may be powdered.

The reactive material of the composite particles may comprise activated carbons, or organoclays. Alternatively, the reactive material of the composite particles may comprise one or more proprietary products, non-limiting examples of which include Provect-IR™, a media treatment reagent available from Provectus Environmental Products, Inc. Freeport, Ill., USA, which is a metal remediation compound with a controlled-release feature of integrated carbon and zero-valent iron for in situ treatment and immobilization of soluble metals in groundwater and saturated soil, and/or MAR Systems' SORBSTER® media treatment reagent, which is a product containing aluminum oxide, silicon dioxide, iron oxide, ferric sulfate and iron sulfide, for removing metal contaminants, such as mercury, from water.

When composite particles having a sealant layer of water absorbent clay are exposed to water, the clay readily hydrates and swells to form a continuous seal or barrier layer having extremely low or no water permeability, which is effective for preventing migration, or avoiding leakage, of sediment, groundwater, gas, and/or contaminants there through. The seal or barrier layer may have any desired thickness, a non-limiting example of which includes a seal or barrier layer having a thickness of about 1 to about 4 inches (~2.5 to 10 cm).

The composite particles may have any desired weight percent ratio of sealant layer to core, based on a total weight of the composite particles, non-limiting examples of which include:

| Sealant layer (wt %) | Core (wt %) |
|---|---|
| 5 | 95 |
| 10 | 90 |
| 15 | 85 |
| 20 | 80 |
| 25 | 75 |
| 30 | 70 |
| 35 | 65 |
| 40 | 60 |
| 45 | 55 |
| 50 | 50 |

The composite particles may have any desired dry bulk density, non-limiting examples of which include a dry bulk density of 70-90 lbs/ft$^3$, (i.e. about 1121 to 1442 kg/m$^3$) including 88-90 lbs/ft$^3$ (i.e. about 1410 to 1442 kg/m$^3$) consolidated, and 83-85 lbs/ft$^3$ (i.e. about 1329 to 1362 kg/m$^3$) unconsolidated. The composite particles may have a specific gravity of greater than 1.0.

The composite particles may, depending on use, have any desired water permeability or hydraulic conductivity, non-limiting examples of which include a water permeability or hydraulic conductivity (K) of $1 \times 10^{-1}$ cm/sec or less, including $1 \times 10^{-3}$ cm/sec or less, $1 \times 10^{-4}$ cm/sec or less, $1 \times 10^{-5}$ cm/sec or less, $1 \times 10^{-6}$ cm/sec or less, $1 \times 10^{-7}$ cm/sec or less, $1 \times 10^{-8}$ cm/sec or less, $1 \times 10^{-9}$ cm/sec, or having a conductivity in the range from $1 \times 10^{-1}$ to $1 \times 10^{-6}$ cm/sec, from $1 \times 10^{-2}$ to $1 \times 10^{-7}$ cm/sec, from $1 \times 10^{-3}$ to $1 \times 10^{-5}$ cm/sec, from $1 \times 10^{-3}$ to $1 \times 10^{-9}$ cm/sec, from $1 \times 10^{-4}$ to $1 \times 10^{-8}$ cm/sec, from $1 \times 10^{-4}$ to $1 \times 10^{-9}$ cm/sec from $1 \times 10^{-5}$ to $1 \times 10^{-9}$ cm/sec, and from $1 \times 10^{-6}$ to $1 \times 10^{-9}$ cm/sec.

The composite particles may further comprise one or more binders to promote adhesion of the sealant layer to the core. A non-limiting example of the binder includes a cellulosic polymer. The composite particles may further comprise one or more additional layers containing one or more desired materials and having any desired thickness.

The composite particles referenced and described above can of course be custom-formulated to meet unique site-specific demands for a particular project. For example, specific attention to design formulations may be necessary in order to create a long preferential flow path and/or provide sufficient contact and residence times to enable reactions (e.g., sorption, complexation, and/or precipitation) to occur to facilitate the capture and removal of contaminants from pore fluids, particularly when ebullition is the driver. Accordingly, the foregoing discussion regarding the composite particles is for illustrative purposes only and not intended to be limited to the specific aspects exemplified herein, but is to be accorded the broadest reasonable scope consistent with the general principles and features referenced and disclosed herein.

AB and BB composite particles may be characterized by a formulation that emphasizes a high swelling clay reactive material so as to create an extremely low permeability cap or impermeable cap with a hydraulic conductivity (K) of $1 \times 10^{-7}$ cm/sec or less or $1 \times 10^{-8}$ cm/sec or less, including from $1 \times 10^{-7}$ to $1 \times 10^{-9}$ cm/sec.

On the other hand, AG composite particles may be characterized by a formulation that comprises a core containing a granular piece of stone, rock, gravel, sand or slag that can be at least partially encapsulated within a non-swelling reactive material (e.g., powdered activated carbon, (a.k.a. PAC) to produce a porous or permeable treatment material (e.g., a porous or permeable treatment blanket, layer, wall, or similar structure) having a water permeability or hydraulic conductivity (K) of from about $1 \times 10^{-2}$ to about $1 \times 10^{-6}$ cm/s, depending on the particle size of the composite particle and the potential for swelling of the reactive material. Permeable composite particles may have permeabilities in sub-ranges within these permeability limits.

The sealant layer of the AG composite particles may comprise a hydratable and/or swellable reactive material (e.g., water absorbent clay) but only in minor amounts in order to avoid substantial swelling of the sealant layer upon exposure to water or moisture, so as not to interfere with and/or inhibit the flow of contaminated pore fluids therethrough.

For example, the AG composite particle may comprise 20 wt. % or less of a hydratable and/or swellable reactive material (e.g., water absorbent clay), based on a total weight of the AG composite particle, in order to avoid substantial swelling of the sealant layer upon exposure to water or moisture. Non-limiting examples of which include 20 wt. % or less, 19 wt. % or less, 18 wt. % or less, 17 wt. % or less, 16 wt. % or less, 15 wt. % or less, 14 wt. % or less, 13 wt. % or less, 12 wt. % or less, 11 wt. % or less, 10 wt. % or less, 9 wt. % or less, 8 wt. % or less, 7 wt. % or less, 6 wt. % or less, 5 wt. % or less, 4 wt. % or less, 3 wt. % or less, 2 wt. % or less, and 1 wt. % or less, of a hydratable and/or swellable reactive material (e.g., water absorbent clay), based on a total weight of the AG composite particle.

The dense, granular nature of the composite particles enables them to be easily and uniformly deployed and deposited through a water column (via Stoke's law) and onto the sediment surface using conventional materials handling equipment. Since a significant amount of water treatment occurs at or near the surface of the composite particle, inclusion of expensive reactive materials into a central core of the composite particle can be avoided.

AB composite particles may be used alone to form an AB passive impermeable capping layer or blended with other aggregate materials to form a BB capping layer. AG composite particles may be used alone to form an AG active/reactive treatment and permeable drainage blanket layer. AB and AG composite particles may be used together in an active/reactive sediment capping system, which may be arranged in an AB/AG layered "funnel and gate" fashion.

Self-Regenerating Reactive Materials

As noted above, the reactive materials may become saturated and their sorptive capacity exhausted. Certain microbes are known to utilize various contaminants as a food source. Examples of microbes for aerobic biodegradation of aromatic compounds include *Burkholderia xenovorans* LB400 and *Rhodococcus* sp. strain RHA1.

Examples of microbes for anaerobic biodegradation of pollutants include hydrocarbon-degrading and reductively dehalogenating bacteria discovered during the last decades, as well as the facultative denitrifying *Aromatoleum aromaticum* strain EbN1. Also relevant are microbes in the iron-reducing species *Geobacter metallireducens* (accession nr. NC_007517) and the perchlorate-reducing *Dechloromonas aromatica* (accession nr. NC_007298). Microbes especially useful for biodegradation of PCBs are the halorespirating Chloroflexi family, including the species *Dehalococcoides* and *Dehalobim*. Representative examples include *Dehalococcoides* sp. strain CBDB1, *Dehalococcoides mccartyi* strain 195 (formerly *Dehalococcoides ethenogenes*) and *Dehalobium chlorocoerocia* strains DF1 and o-17. For other contaminants, *Desulfitobacterium hafniense* strain Y51, and the *Desulfitobacterium chlororespirans* may be useful.

Further evidence of halorespirating organisms deactivating PCBs is found in Sowers, et al, *In-situ Treatment of PCS by anaerobic microbial dechlorination in aquatic sediment: are we there yet?*, Current Opinion in Biotechnology 2012, 24:1-7 (see table 1 in particular); and in Payne et al, *Enhanced Reductive Dechlorinatiion of Polychlorinated Biphenyl Impacted Sediment by Bioaugmentation with s Dehalorespiring Bacterium*, Environ. Sci. Technol., 2011, 45:8772-8779, both of which are incorporated by reference.

These microbes are capable of existing in a dormant state that allows them to be delivered to a sediment capping system. Although such organisms have been utilized with organoclays by Alther et al, the ability to incorporate them into composite particles like those sold by AquaBlok is new. In this way, one combines the delivery of sorbent amendments coupled with appropriately selected dormant microbes so that, while the sorbents begin to concentrate the contaminant, the microbes become active and consume the contaminant resulting in the generation of less toxic by-products that can be released into the environment through diffusion or ebullition. The microbes consume the contaminants as they are sorbed, thereby amounting to in-situ biodegradation to render captured contaminants less toxic and to restore the sorptive capacity of the treatment amendment, thus prolonging the lifespan of the treatment system.

The microbes may be incorporated into the same particles as a reactive material, or the reactive material may be incorporated into one type of particle, while the microbes are incorporated into a second type of particle. If desired, nutrients such as oxygen and carbon, and/or micronutrients such as vitamins, cofactors, etc, or buffers or other adjunctive materials may be incorporated into the composite particles, either with the dormant microbes or in auxiliary particles, to achieve enhanced microbial activity. In two particle-type systems, the placement of a targeted layer of appropriately blended materials through a water column to provide a combination interim sorption active cap layer is achieved by balancing relative particle size and density using Stokes Law. In some cases it may be desirable to lay down reactive material and/or nutrients/micronutrients simultaneously with microbes; and in other cases it may be desirable to lay down reactive material and/or nutrients/micronutrients in advance of the microbes. Other permutations and order combinations are possible, depending on the particular deployments situation and contaminants.

Selected Applications and Uses

FIG. 1 is a cross-sectional view of an AB/AG sediment capping system of the type into which a RTC may be retrofitted in accordance with the invention. The upper or overlying AquaBlok® (AB) layer 22 serves as a passive impermeable cap, while the lower or underlying layer 24 (AquaGate™ or AG) may serve as an active/reactive treatment and permeable drainage blanket, enabling a directional horizontal flow (arrows 25) of pore fluids (e.g. gas/water/NAPL).

The AB layer or cap 22 may have any desired thickness, a non-limiting example of which includes about 4 to about 12 inches. The AG layer 24 or drainage blanket may have any desired thickness, a non-limiting example of which includes about 1 inch or more. Of course, the aforementioned thicknesses may be optimized to a particular project having site-specific issues, demands and conditions.

An important feature of the AG layer 24, 88 is that it must be more permeable than both the underlying sediment 16 and the overlying AB and BB layer 22, 90 so that the AG layer creates a long preferential flow path 25 and/or provides sufficient contact and residence times to enable reactions (e.g., sorption, complexation, destruction, and/or precipitation) to occur to facilitate the capture and removal of contaminants from pore fluids (e.g. groundwater and/or gas).

As the contaminated pore fluid preferentially flows into and through the AG layer 24, 88, the contaminated pore fluid is actively treated until it daylights at the leftmost extent of the AG layer 24 and enters into the overlying water column 10 or surface water. The exposed section of the AG layer also facilitates the dissipation of positive pore water pressure associated with upwelling pore fluid.

Active/reactive sediment capping systems have been described above in connection with FIG. 1. In particular, the reactive capping systems of AquaBlok, Ltd. utilize a composite particle comprising a core or aggregate material in combination with various amendments such as sorbents. In accordance with the present invention, the reactive layer, portion or material within such systems may employ a self-regenerating reactive material as described below.

As described herein, combinations of materials may be used in forming either of the two major layers of a capping system. For example, the BB layer of the BB/AG system is itself a blend of AB composite particles with aggregate. Other materials such as slag, clays, sand, mortars, binders, etc. might be used in combination with AB particles for the impermeable layer, which should have a hydraulic conductivity of $1\times10^{-6}$ cm/sec or less, including $1\times10^{-7}$ cm/sec or less, $1\times10^{-8}$ cm/sec or less, and $1\times10^{-9}$ cm/sec or less. Similarly, the permeable layer may itself be a combination of materials, such as composite particles in combination with aggregate, slag, sand and/or other drainage blankets or systems. The permeable layer should have a hydraulic conductivity of from about $1\times10^{-1}$ cm/sec to about $1\times10^{-6}$ cm/sec, including from $1\times10^{-1}$ to $1\times10^{-5}$ cm/sec, from $1\times10^{-1}$ to $1\times10^{-4}$ cm/sec, from $1\times10^{-2}$ to $1\times10^{-6}$ cm/sec, from $1\times10^{-2}$ to $1\times10^{-5}$ cm/sec, and from $1\times10^{-2}$ to $1\times10^{-4}$ cm/sec. The combination of different materials in the permeable layer can add variations that impact the degree of permeability as well as the distribution of any active reagents that might be warranted in a particular "active/reactive" capping installation.

The principle and mode of operation of this invention have been explained and illustrated with respect to various exemplary embodiments. Of course, this invention may be practiced otherwise than as specifically explained and illustrated herein without departing from its spirit or scope. Accordingly, numerous modifications and variations on the present invention are obviously possible in light of the disclosure and thus the present invention may be practiced otherwise than as specifically described herein without departing from the spirit and scope of the present invention. Therefore, the foregoing disclosure is merely illustrative of various exemplary aspects of the present invention and numerous modifications and variations can be readily made by skilled artisans that fall within the scope of the accompanying disclosure.

What is claimed is:

1. A system of composite particles for remediation of a contaminated sediment area, the system comprising two or more types of composite particles, each particle having a core and a permeable coating, wherein:

the permeable coating of a first-type particle contains a reactive material comprising at least one reactive composition for fixing, complexing, adsorbing, or absorbing a contaminant;

the permeable coating of a second-type particle contains dormant microbes capable of consuming organic contaminants fixed, complexed, or sorbed by the reactive material, wherein the permeable coating of the second-type particle does not contain the reactive material;

the core of the first-type particle comprises stone, rock, or gravel;

the first-type particle and the second-type particle have a particle diameter ranging from about 5 mm to about 20 mm; and optionally, the system further comprises nutrients, micronutrients, buffers, or other adjunctive materials.

2. The system of claim 1 further comprising auxiliary composite particles having a core and a coating, the coating containing nutrients, micronutrients, buffers or other adjunctive material to sustain the microbes.

3. The system of claim 1 wherein the particles of the first type are engineered to have a different density or particle size so as to settle at a different rate from the particles of the second type.

4. The system of claim 1 wherein the reactive material comprises at least one sorptive composition selected from clay, organoclay, and activated carbon.

5. The system of claim 4 wherein the reactive material comprises from 1% to about 20% by weight of the composite particle.

6. The system of claim 1 wherein the dormant microbes are of a class capable of aerobic biodegradation of aromatic compounds.

7. The system of claim 1 wherein the dormant microbes are of a class capable of dehalogenating or denitrifying pollutants.

8. The system of claim 1 wherein the dormant microbes are of a class capable of reducing iron or perchlorate.

9. A method of using a composite particle system of claim 1, the method comprising deploying the two particle types in a water column over a contaminated area, wherein the particles settle to the bottom to form a reactive layer of a sediment capping system.

10. The method of claim 9 wherein the particles of the first type are engineered to have a different density or particle size so as to settle at a faster rate than the particles of the second type, and further comprising simultaneously deploying the first and second particle types in a water column, wherein particles of the first type settle faster and end up beneath the particles of the second type.

11. The method of claim 9 further comprising regenerating the sorptive capacity of the reactive composition by activating the dormant microbes to consume and biodegrade contaminants from the reactive material, thereby restoring the sorptive capacity of the reactive composition.

12. The method of claim 11, wherein the dormant microbes are activated by concentration of a contaminant fixed, complexed, adsorbed, or absorbed by the reactive material.

13. The method of claim 9 further comprising deploying an impermeable capping layer over the reactive layer.

14. A method of remediating a selected contaminant area with a sorptive media, the method comprising:
deploying over the selected contaminant area in a water column a remedial layer of two or more types of composite particles, each composite particle having a core and a permeable coating, the core comprising stone, rock, or gravel, the coating of a first-type composite particle containing a reactive material comprising at least one reactive composition having a sorptive capacity for fixing, complexing, adsorbing, or absorbing a contaminant, and the coating of a second-type composite particle containing dormant microbes capable of consuming contaminants fixed, complexed, or sorbed by the reactive material, optionally with nutrients, micronutrients, buffers, or other adjunctive materials for sustaining the microbes, wherein the coating of the second-type composite particle does not contain the reactive material, and wherein the first-type particle and the second-type particle have a particle diameter ranging from about 5 mm to about 20 mm;
allowing the reactive material to fix, complex, adsorb, or absorb a contaminant from the contaminant area; and
regenerating the sorptive capacity of the reactive material in-situ by activating the dormant microbes, and allowing them to consume and biodegrade contaminants from the reactive material.

15. The method of claim 14 further comprising:
deploying over the reactive layer additional composite particles having a core and a swellable coating; and
hydrating the additional composite particles to form a barrier or sequestration layer over the remedial layer.

16. The method of claim 14 wherein the reactive material comprises at least one sorptive composition selected from clay, organoclay, and activated carbon.

17. The method of claim 14 wherein the dormant microbes are selected from at least one of:
a class capable of aerobic biodegradation of aromatic compounds;
a class capable of dehalogenating or denitrifying pollutants; and
a class capable of reducing iron or perchlorate.

18. The system of claim 1 wherein the dormant microbes are of a class capable of anaerobic biodegradation of pollutants.

19. The method of claim 14 wherein the dormant microbes are of a class capable of anaerobic biodegradation of pollutants.

20. The system of claim 1 wherein the particles of the first type are engineered to have a density or particle size so as to settle at the same rate as the particles of the second type.

21. The method of claim 14, wherein the particles of the first type are engineered to have a density or particle size so as to settle at the same rate as the particles of the second type.

22. The method of claim 14, wherein the first-type particle is laid down in advance of the second-type particle.

* * * * *